(12) United States Patent
Zhang et al.

(10) Patent No.: US 11,012,948 B2
(45) Date of Patent: May 18, 2021

(54) UPLINK MEASUREMENT REFERENCE SIGNAL POWER CONTROL METHOD, NETWORK DEVICE, AND TERMINAL DEVICE

(71) Applicant: Huawei Technologies Co., Ltd., Shenzhen (CN)

(72) Inventors: Leiming Zhang, Beijing (CN); Ming Lei, Shenzhen (CN); Yifan Liu, Shenzhen (CN)

(73) Assignee: Huawei Teclinologies Co., Ltd., Shenzhen (CN)

( * ) Notice: Subject to any disclaimer, the term of this patent is extended or adjusted under 35 U.S.C. 154(b) by 0 days.

(21) Appl. No.: 16/523,752

(22) Filed: Jul. 26, 2019

(65) Prior Publication Data

US 2019/0349868 A1 Nov. 14, 2019

Related U.S. Application Data

(63) Continuation of application No. PCT/CN2017/115674, filed on Dec. 12, 2017.

(30) Foreign Application Priority Data

Jan. 26, 2017 (CN) .......................... 201710057540.7

(51) Int. Cl.
*H04W 52/32* (2009.01)
*H04W 52/14* (2009.01)
(Continued)

(52) U.S. Cl.
CPC ......... *H04W 52/325* (2013.01); *H04L 5/0051* (2013.01); *H04L 25/0226* (2013.01);
(Continued)

(58) Field of Classification Search
CPC ............. H04W 52/325; H04W 52/146; H04W 52/242; H04W 52/36; H04L 5/0051; H04L 25/0226
See application file for complete search history.

(56) References Cited

U.S. PATENT DOCUMENTS

2009/0286566 A1\* 11/2009 Lindholm ................ H04B 7/00
2013/0114454 A1\* 5/2013 Hwang ................ H04W 24/02
(Continued)

FOREIGN PATENT DOCUMENTS

| CN | 102958146 A | 3/2013 |
| CN | 103379603 A | 10/2013 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification(Release 14)," 3GPP TS 36.331 V14.1.0, pp. 1-654, 3rd Generation Partnership Project, Valbonne, France (Dec. 2016).

(Continued)

*Primary Examiner* — Ronald B Abelson
(74) *Attorney, Agent, or Firm* — Leydig, Voit & Mayer, Ltd.

(57) ABSTRACT

An uplink measurement reference signal power control method, a network device, and a terminal device are provided. The method includes: generating, by the network device, power control information of an uplink measurement reference signal, where the power control information includes at least one of a transmit power target value, a transmit power adjustment value, or path loss information; and sending, by the network device, the power control information to the terminal device. According to the method provided in the embodiments of this application, the network device generates the power control information, and (Continued)

the power control information includes at least one of the foregoing three types of information and is indicated to the terminal device.

16 Claims, 5 Drawing Sheets

(51) Int. Cl.
    *H04W 52/24*     (2009.01)
    *H04W 52/36*     (2009.01)
    *H04L 5/00*     (2006.01)
    *H04L 25/02*     (2006.01)

(52) U.S. Cl.
    CPC ....... *H04W 52/146* (2013.01); *H04W 52/242* (2013.01); *H04W 52/36* (2013.01)

(56) References Cited

U.S. PATENT DOCUMENTS

| | | | |
|---|---|---|---|
| 2014/0162718 A1 | 6/2014 | Li | |
| 2014/0219152 A1* | 8/2014 | Anto | H04W 52/08 |
| 2015/0072690 A1 | 3/2015 | Kim et al. | |
| 2018/0014257 A1 | 1/2018 | Ouchi et al. | |
| 2018/0041258 A1 | 2/2018 | Tong | |

FOREIGN PATENT DOCUMENTS

| | | | |
|---|---|---|---|
| CN | 103843423 A | 6/2014 | |
| CN | 106160952 A | 11/2016 | |
| EP | 2763471 A1 | 8/2014 | |
| EP | 3038281 A1 | 6/2016 | |
| EP | 3454608 A1 | 3/2019 | |
| JP | 2013085233 A | 5/2013 | |
| JP | 2016535471 A | 11/2016 | |
| WO | 2010151196 A1 | 12/2010 | |
| WO | 2018202014 A1 | 11/2018 | |

OTHER PUBLICATIONS

"Uplink Power Control for MIMO," 3GPP TSG RAN WG1 NR Ad-Hoc Meeting, Spokane, USA, R1-1701109, pp. 1-5, 3rd Generation Partnership Project, Valbonne, France (Jan. 16-20, 2017).

* cited by examiner

UPLINK MEASUREMENT REFERENCE SIGNAL POWER CONTROL METHOD, NETWORK DEVICE, AND TERMINAL DEVICE

CROSS-REFERENCE TO RELATED APPLICATIONS

This application is a continuation of International Application No. PCT/CN2017/115674, filed on Dec. 12, 2017, which claim the priority to Chinese Patent Application No. 201710057540.7, filed on Jan. 26, 2107. The disclosures of the aforementioned applications are hereby incorporated by reference in their entireties.

TECHNICAL FIELD

Embodiments of this application relate to the field of communications technologies, and in particular, to an uplink measurement reference signal power control method, a network device, and a terminal device.

BACKGROUND

In a high-frequency communication scenario of 5G new radio (5th generation new radio, 5G NR), to enhance a coverage range and transmission efficiency of an uplink measurement reference signal (such as Sounding Reference Signal (SRS)), a quantity of transmit/receive antennas of a base station and a terminal are further increased. The uplink SRS sent may be a non-precoded SRS in an existing LTE system, or may be a precoded SRS and/or a beamformed SRS.

However, when only the precoded SRS or the beamformed SRS is sent, a cell-center user cannot obtain complete channel information, and forming information or a precoding matrix used by the precoded SRS or the beamformed SRS is also difficult to obtain. Therefore, in a typical application scenario of a 5G mobile communications system, two different forms of SRSs are generally included, one is an existing SRS resource used to obtain the forming information or the precoding matrix used by the precoded SRS or the beamformed SRS, and the other is the precoded SRS or the beamformed SRS. In a scenario in which a plurality of SRS resources coexist, quantities of transmit antenna ports in an SRS sending mode and a data sending mode are not completely the same, and forming manners between the transmit antenna port and a transmit antenna are not completely the same. For example, in the SRS sending mode, SRSs are sent through four antenna ports and are formed in a 4×4 unit array; and in the data sending mode, data is sent through two antenna ports and is formed in a 2×4 unit array. In addition, different SRS resources use different beams, and the different beams also have different beam gains and beam coverage ranges.

If an existing SRS power control policy is still used, to be specific, only one SRS power configuration mode is available, and configuration of the SRS power control policy is associated with configuration of a data power control policy, as a terminal device moves, SRS resources sent at a same moment and a plurality of SRS resources sent at different moments correspond to a same SRS resource power control policy. Consequently, a plurality of SRS resources may fail to match a channel condition, for example, SRS power is insufficient or excessive.

SUMMARY

Embodiments of this application provide an uplink measurement reference signal power control method, a network device, and a terminal device, so as to resolve a prior-art problem that a plurality of SRS resources fail to match a channel condition due to a same SRS power control policy.

To resolve the foregoing technical problem, the embodiments of this application disclose the following technical solutions. According to a first aspect of the embodiments of this application, an uplink measurement reference signal power control method is provided, including: generating, by a network device, power indication information of an uplink measurement reference signal, where the power indication information includes at least one of a transmit power target value, a transmit power adjustment value, and path loss information; and sending, by the network device, the power control information to a terminal device.

With reference to the first aspect, in a first possible implementation of the first aspect, the path loss information includes at least one of the following: a path loss value, a reference signal received power (RSRP) value, and at least one downlink measurement reference resource that is referenced during path loss calculation.

With reference to the first aspect, in a second possible implementation of the first aspect, the method further includes: for a plurality of uplink measurement reference signal resources, performing, by the network device, any of the following processing: configuring a separate transmit power adjustment value, a separate transmit power adjustment value, and separate path loss information for each uplink measurement reference signal resource; configuring a separate target value and a separate adjustment value for each uplink measurement reference signal resource, and configuring shared path loss information; configuring a separate target value for each uplink measurement reference signal resource, and configuring a shared adjustment value and shared path loss information; configuring a separate target value and separate path loss information for each uplink measurement reference signal resource, and configuring a shared adjustment value; configuring a shared target value, and configuring a separate adjustment value and separate path loss information for each uplink measurement reference signal resource; configuring a shared target value and shared path loss information, and configuring a separate adjustment value for each uplink measurement reference signal resource; configuring a shared target value, a shared adjustment value, and shared path loss information; or configuring a shared target value and a shared adjustment value, and configuring separate path loss information for each uplink measurement reference signal resource.

With reference to the first aspect, in a third possible implementation of the first aspect, the method further includes: generating, by the network device, forming information corresponding to the power indication information; where the forming information includes at least one of the following: an index of the downlink measurement reference resource, a codebook index value, and quantized channel information; and sending, by the network device, the forming information to the terminal device.

According to a second aspect, an embodiment of this application provides an uplink measurement reference signal power control method, including: receiving, by a terminal device, power indication information, where the power indication information includes at least one of a transmit power target value of an uplink measurement reference signal, a transmit power adjustment value, and path loss information; sending, by the terminal device, an uplink measurement reference signal to the network device based on the power control information.

With reference to the second aspect, in a first possible implementation of the second aspect, the path loss information includes at least one of the following: a path loss value, a reference signal received power (RSRP) value, and at least one downlink measurement reference resource that is referenced during path loss calculation.

With reference to the second aspect, in a second possible implementation of the second aspect, the method further includes: calculating, by the terminal device, a path loss value of each of a plurality of downlink measurement reference resources; and determining, by the terminal device, that an average value of the plurality of path loss values, a minimum path loss value of the plurality of path loss values, or a maximum path loss value of the plurality of path loss values is the path loss value.

With reference to the second aspect, in a third possible implementation of the second aspect, a plurality of transmit power target values, a plurality of transmit power adjustment values, and a plurality of pieces of path loss information that are obtained by the terminal device based on the power indication information are corresponding to a plurality of uplink measurement reference signal resources; or a plurality of target values and a plurality of adjustment values that are obtained by the terminal device based on the power indication information are corresponding to a plurality of uplink measurement reference signal resources, and one piece of path loss information obtained by the terminal device based on the power indication information is corresponding to the plurality of uplink measurement reference signal resources; or a plurality of target values that are obtained by the terminal device based on the power indication information are corresponding to a plurality of uplink measurement reference signal resources, and one adjustment value and one piece of path loss information that are obtained by the terminal device based on the power indication information are corresponding to the plurality of uplink measurement reference signal resources; or a plurality of target values and a plurality of pieces of path loss information that are obtained by the terminal device based on the power indication information are corresponding to a plurality of uplink measurement reference signal resources, and one adjustment value that is obtained by the terminal device based on the power indication information is corresponding to the plurality of uplink measurement reference signal resources; or one target value that is obtained by the terminal device based on the power indication information is corresponding to a plurality of uplink measurement reference signal resources, and a plurality of adjustment values and a plurality of pieces of path loss information that are obtained by the terminal device based on the power indication information are corresponding to the plurality of uplink measurement reference signal resources; or one target value and one piece of path loss information that are obtained by the terminal device based on the power indication information are corresponding to a plurality of uplink measurement reference signal resources, and a plurality of adjustment values that are obtained by the terminal device based on the power indication information are corresponding to the plurality of uplink measurement reference signal resources; or one target value, one adjustment value, and one piece of path loss information that are obtained by the terminal device based on the power indication information are corresponding to a plurality of uplink measurement reference signal resources; or one target value and one adjustment value that are obtained by the terminal device based on the power indication information are corresponding to a plurality of uplink measurement reference signal resources, and a plurality of pieces of path loss information obtained by the terminal device based on the power indication information are corresponding to the plurality of uplink measurement reference signal resources.

With reference to the second aspect, in a fourth possible implementation of the second aspect, the method further includes: receiving, by the terminal device, forming information from the network device, where the forming information is corresponding to the power indication information, and the forming information includes an index of the downlink measurement reference resource, a codebook index value, or quantized channel information; and sending, by the terminal device, the uplink measurement reference signal to the network device based on the power control information and the forming information.

According to a third aspect, an embodiment of this application provides a network device, including: a processing module, configured to generate power indication information of an uplink measurement reference signal, where the power indication information includes at least one of a transmit power target value, a transmit power adjustment value, and path loss information; and a sending module, configured to send the power control information to a terminal device.

With reference to the third aspect, in a first possible implementation of the third aspect, the path loss information includes at least one of the following: a path loss value, a reference signal received power RSRP value, and at least one downlink measurement reference resource that is referenced during path loss calculation.

With reference to the third aspect, in a second possible implementation of the third aspect, for a plurality of uplink measurement reference signal resources, the processing module is further configured to perform any of the following processing: configuring a separate transmit power adjustment value, a separate transmit power adjustment value, and separate path loss information for each uplink measurement reference signal resource; configuring a separate target value and a separate adjustment value for each uplink measurement reference signal resource, and configuring shared path loss information; configuring a separate target value for each uplink measurement reference signal resource, and configuring a shared adjustment value and shared path loss information; configuring a separate target value and separate path loss information for each uplink measurement reference signal resource, and configuring a shared adjustment value; configuring a shared target value, and configuring a separate adjustment value and separate path loss information for each uplink measurement reference signal resource; configuring a shared target value and shared path loss information, and configuring a separate adjustment value for each uplink measurement reference signal resource; configuring a shared target value, a shared adjustment value, and shared path loss information; or configuring a shared target value and a shared adjustment value, and configuring separate path loss information for each uplink measurement reference signal resource.

With reference to the third aspect, in a third possible implementation of the third aspect, in the network device, the processing module is further configured to generate forming information corresponding to the power indication information; where the forming information includes at least one of the following: an index of the downlink measurement reference resource, a codebook index value, and quantized channel information; and the sending module is further configured to send the forming information to the terminal device.

According to a fourth aspect, an embodiment of this application provides a terminal device, including: a receiving module, configured to receive power indication information, where the power indication information includes at least one of a transmit power target value of an uplink measurement reference signal, a transmit power adjustment value, and path loss information; a processing module, configured to generate the uplink measurement reference signal based on the power control information; and a sending module, configured to send the uplink measurement reference signal to the network device.

With reference to the fourth aspect, in a first possible implementation of the fourth aspect, the path loss information includes at least one of the following: a path loss value, a reference signal received power RSRP value, and at least one downlink measurement reference resource that is referenced during path loss calculation.

With reference to the fourth aspect, in a second possible implementation of the fourth aspect, in the terminal device, the processing module is further configured to calculate a path loss value of each of a plurality of downlink measurement reference resources; and the processing module is further configured to determine that an average value of the plurality of path loss values, a minimum path loss value of the plurality of path loss values, or a maximum path loss value of the plurality of path loss values is the path loss value.

With reference to the fourth aspect, in a third possible implementation of the fourth aspect, a plurality of transmit power target values, a plurality of transmit power adjustment values, and a plurality of pieces of path loss information that are obtained by the processing module based on the power indication information are corresponding to a plurality of uplink measurement reference signal resources; or a plurality of target values and a plurality of adjustment values that are obtained by the processing module based on the power indication information are corresponding to a plurality of uplink measurement reference signal resources, and one piece of path loss information obtained by the processing module based on the power indication information is corresponding to the plurality of uplink measurement reference signal resources; or a plurality of target values that are obtained by the processing module based on the power indication information are corresponding to a plurality of uplink measurement reference signal resources, and one adjustment value and one piece of path loss information that are obtained by the processing module based on the power indication information are corresponding to the plurality of uplink measurement reference signal resources; or a plurality of target values and a plurality of pieces of path loss information that are obtained by the processing module based on the power indication information are corresponding to a plurality of uplink measurement reference signal resources, and one adjustment value that is obtained by the processing module based on the power indication information is corresponding to the plurality of uplink measurement reference signal resources; or one target value that is obtained by the processing module based on the power indication information is corresponding to a plurality of uplink measurement reference signal resources, and a plurality of adjustment values and a plurality of pieces of path loss information that are obtained by the processing module based on the power indication information are corresponding to the plurality of uplink measurement reference signal resources; or one target value and one piece of path loss information that are obtained by the processing module based on the power indication information are corresponding to a plurality of uplink measurement reference signal resources, and a plurality of adjustment values that are obtained by the processing module based on the power indication information are corresponding to the plurality of uplink measurement reference signal resources; or one target value, one adjustment value, and one piece of path loss information that are obtained by the processing module based on the power indication information are corresponding to a plurality of uplink measurement reference signal resources; or one target value and one adjustment value that are obtained by the processing module based on the power indication information are corresponding to a plurality of uplink measurement reference signal resources, and a plurality of pieces of path loss information obtained by the processing module based on the power indication information are corresponding to the plurality of uplink measurement reference signal resources.

With reference to the fourth aspect, in a fourth possible implementation of the fourth aspect, in the terminal device, the receiving module is further configured to receive forming information from the network device, where the forming information is corresponding to the power indication information, and the forming information includes an index of the downlink measurement reference resource, a codebook index value, or quantized channel information; the processing module is further configured to generate the uplink measurement reference signal based on the power control information and the forming information; and the sending module is further configured to send the uplink measurement reference signal to the network device.

The technical solutions provided in the embodiments of this application may include the following beneficial effects. In the embodiments of this application, the network device first generates the power indication information of the uplink measurement reference signal, where the power indication information includes at least one of the transmit power adjustment value, the transmit power adjustment value, and the path loss information; then the network device sends the power control information to the terminal device; and after the terminal device receives the power indication information, the terminal device sends the uplink measurement reference signal to the network device based on the power control information.

According to the method provided in the embodiments of this application, the network device generates the power indication information, and the power indication information includes at least one of the foregoing three types of information and is indicated to the terminal device, so that the terminal device sends a sounding reference signal to the network device based on the power indication information, and the network device accurately controls transmit power used when the terminal device sends the sounding reference signal.

It should be understood that the foregoing general description and the following detailed description are merely an example for explanation, and do not limit this application.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

To make a person skilled in the art understand the technical solutions in this application better, the following describes the technical solutions in the embodiments of this application with reference to the accompanying drawings in the embodiments of this application.

Figure 1:
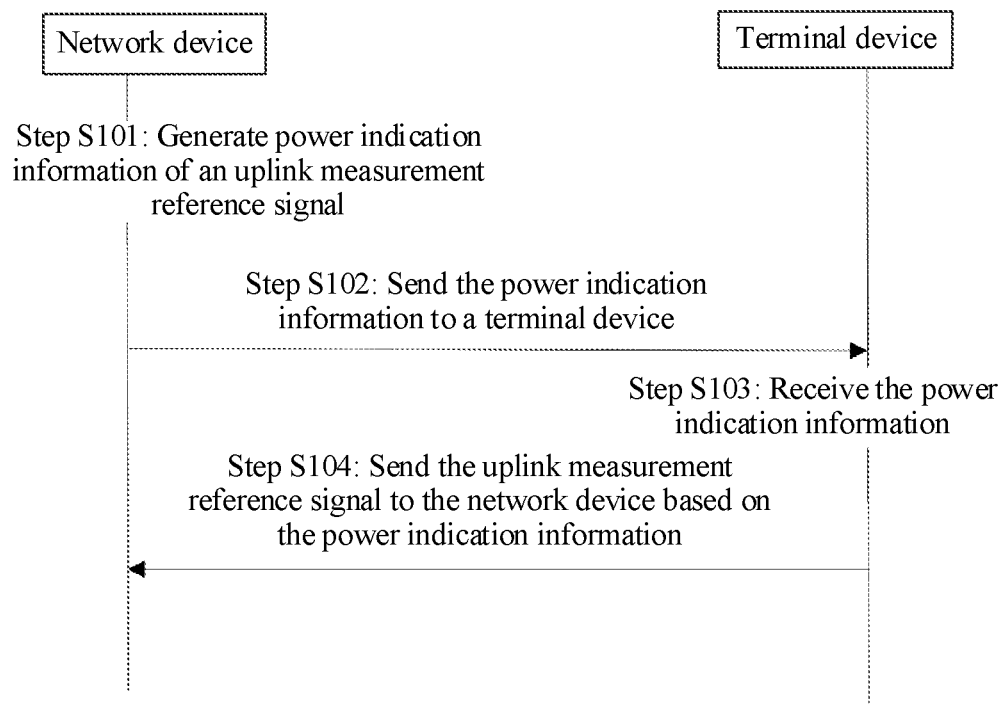
FIG. 1 is a flowchart of an uplink measurement reference signal power control method according to an example embodiment.

To make a match between a plurality of SRS resources and a channel condition, as shown in FIG. 1, in an embodiment of this application, an uplink measurement reference signal power control method is provided. In actual application, to help estimate uplink channel frequency-domain information, and perform frequency selective scheduling, a terminal device 2 periodically sends an SRS to a base station 1. The method includes the following steps.

In step S101, a network device generates power indication information of an uplink measurement reference signal.

In this embodiment of this application, the power indication information includes at least one of a transmit power target value, a transmit power adjustment value, and path loss information. In this embodiment of this application, the uplink measurement reference signal may be a sounding reference signal (SRS) or the like. In actual application, the uplink measurement reference signal may be an uplink measurement reference signal in another form. The path loss information includes at least one of the following: a path loss value, a reference signal received power (RSRP) value, and at least one downlink measurement reference resource that is referenced during path loss calculation.

Because an existing SRS power control policy cannot maintain uplink average interference over thermal (IoT) within a stable range and this affects channel reception, in an embodiment of this application, for a plurality of uplink measurement reference signal resources, the network device may configure a separate transmit power adjustment value, a separate transmit power adjustment value, and separate path loss information for each uplink measurement reference signal resource, that is, the network device configures the separate target value, the separate adjustment value, and the separate path loss information.

Figure 2:
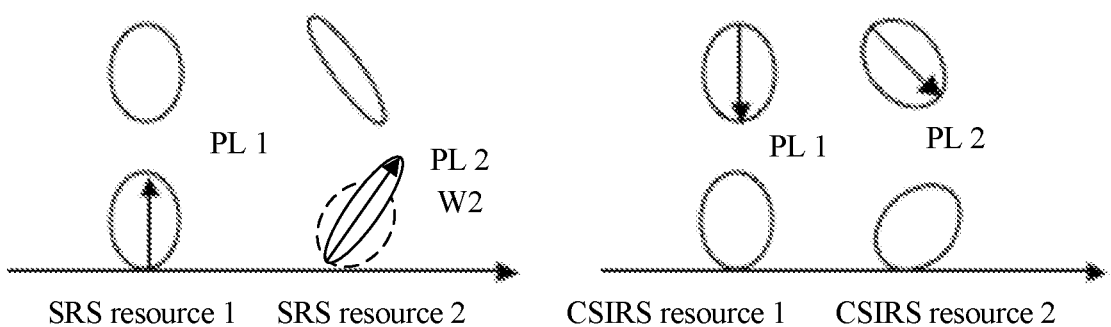
FIG. 2 is a schematic diagram of indicating a power for a plurality of SRS resources according to an example embodiment.

For example, as shown in FIG. 2, the network device determines the power indication information of the uplink measurement reference signal for each SRS resource, and the power indication information of the uplink measurement reference signal includes the target value $P_{O\_SRS,c}$, the adjustment value $f_{SRS,c}(i)$, and the path loss information $PL_c$.

The network device configures the target value $P_{O\_SRS,c}$ and the path loss information $PL_c$ through RRC signaling or MAC CE signaling. The information is usually bound with SRS resource configuration signaling. The path loss information may be used to indicate the path loss value, or a corresponding downlink measurement reference signal resource (for example, an index m of a downlink measurement reference signal resource) used when the path loss value is calculated. The downlink measurement reference resource referenced during the path loss calculation may be one downlink measurement reference resource or a plurality of downlink measurement reference resources. If the downlink measurement reference resource referenced is one downlink measurement reference resource, when the terminal knows the corresponding downlink measurement reference signal resource used when the path loss value is calculated, the terminal may directly read a stored path loss value or RSRP value calculated by using the downlink measurement reference signal resource. If the terminal can read only the reference signal received power (RSRP) value, the terminal further calculates the path loss value based on the path loss information PL=Ptx−RSRP. If the downlink measurement reference resource referenced during the path loss calculation is a plurality of downlink measurement reference resources, the terminal takes an average value of the path loss values calculated based on the plurality of downlink measurement reference resources, or takes a minimum value from the path loss values calculated based on the plurality of downlink measurement reference resources, or takes a maximum value from the path loss values calculated based on the plurality of downlink measurement reference resources.

The network device configures the adjustment value $f_{SRS,c}(i)$ through physical layer signaling. Typically, an uplink power control area of the physical layer signaling includes a plurality of SRS resource power control adjustment values, respectively indicating a power control adjustment value for each SRS resource. The power adjustment value may be indicated in a cumulative manner, or may be indicated in a direct manner.

This embodiment of this application is applicable to any SRS resource configuration, for example, different SRS resources use different analog beams and digital beams, so that uplink power of each SRS resource is accurately controlled.

In another embodiment of this application, for the plurality of uplink measurement reference signal resources, the network device may configure a separate target value and a separate adjustment value for each uplink measurement reference signal resource, and configure shared path loss information, in other words, the network device configures the separate target value and the separate adjustment value, and shares the path loss information.

Figure 3:
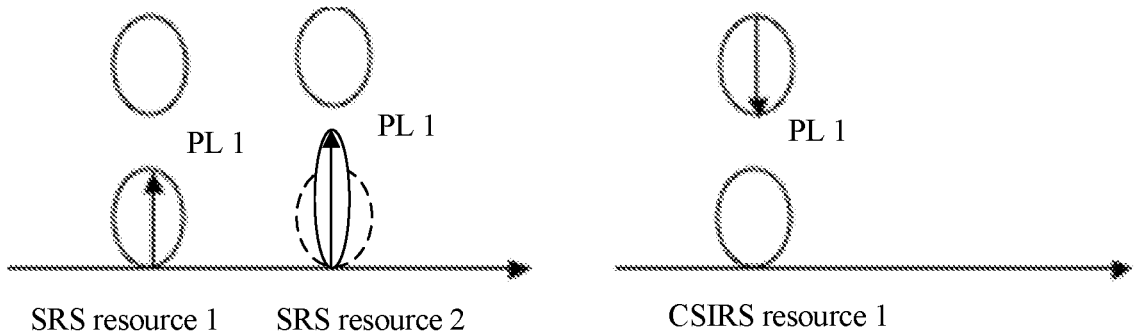
FIG. 3 is another schematic diagram of indicating a power for a plurality of SRS resources according to an example embodiment.

For example, as shown in FIG. 3, the network device determines the power indication information of the uplink measurement reference signal for each SRS resource, including the target value $P_{O\_SRS_{\varsigma}}$ and the adjustment value $f_{SRS,c}(i)$.

The network device configures the target value $P_{O\_SRS_{\varsigma}}$ through RRC signaling or MAC CE signaling. The information is usually bound with SRS resource configuration signaling.

The network device configures the adjustment value $f_{SRS,c}(i)$ through physical layer signaling. Typically, an uplink power control area of the physical layer signaling includes a plurality of SRS resource power control adjustment values, respectively indicating a power control adjustment value for each SRS resource. The power adjustment value may be indicated in a cumulative manner, or may be indicated in a direct manner.

That the network device determines the power indication information of the uplink measurement reference signal for each SRS resource further includes that the network device determines one piece of common path loss information PL for all the SRS resources.

The path loss information may be used to indicate the path loss value, or a corresponding downlink measurement reference signal resource (for example, an index m of a downlink measurement reference signal resource) used when the path loss value is calculated. The downlink measurement reference resource referenced during the path loss calculation may be one downlink measurement reference resource or a plurality of downlink measurement reference resources. If the downlink measurement reference resource referenced is one downlink measurement reference resource, when the terminal knows the corresponding downlink measurement reference signal resource used when the path loss value is calculated, the terminal may directly read a stored path loss value or RSRP value calculated by using the downlink measurement reference signal resource. If the terminal can read only the RSRP value, the terminal further calculates the path loss value based on PL=Ptx−RSRP. If the downlink measurement reference resource referenced during the path loss calculation is a plurality of downlink measurement reference resources, the terminal takes an average value of the path loss values calculated based on the plurality of downlink measurement reference resources, or takes a minimum value from the path loss values calculated based on the plurality of downlink measurement reference resources, or takes a maximum value from the path loss values calculated based on the plurality of downlink measurement reference resources.

This embodiment of this application is applicable to different SRS resources that use a same analog beam and different digital beams, so that path loss information transmission and signaling overheads are reduced.

In another embodiment of this application, for the plurality of uplink measurement reference signal resources, the network device may configure a separate target value for each uplink measurement reference signal resource, and configure a shared adjustment value and shared path loss information, in other words, the network device configures the separate target value, and shares the adjustment value and the path loss information.

Figure 4:
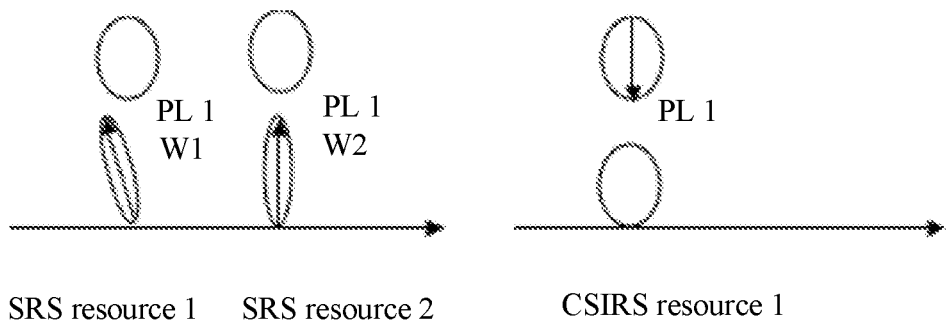
FIG. 4 is another schematic diagram of indicating a power for a plurality of SRS resources according to an example embodiment.

For example, as shown in FIG. 4, the network device determines the power indication information of the uplink measurement reference signal for each SRS resource, and the power indication information includes the target value $P_{O\_SRS_{\varsigma}}$. The network device configures the target value $P_{O\_SRS_{\varsigma}}$ through RRC signaling or MAC CE signaling. The information is usually bound with SRS resource configuration signaling.

That the network device determines the power indication information of the uplink measurement reference signal for each SRS resource further includes that the network device determines a common adjustment value $f_{SRS,c}(i)$ and common path loss information PL for all the SRS resources.

The network device configures the adjustment value $f_{SRS,c}(i)$ through physical layer signaling. Typically, in an uplink power control area of the physical layer signaling, one field is corresponding to one user. The power adjustment value in the field is applicable to all SRS resources of the user. The power adjustment value may be indicated in a cumulative manner, or may be indicated in a direct manner.

The path loss information may be used to indicate the path loss value, or a corresponding downlink measurement reference signal resource (for example, an index m of a downlink measurement reference signal resource) used when the path loss value is calculated. The downlink measurement reference resource referenced during the path loss calculation may be one downlink measurement reference resource or a plurality of downlink measurement reference resources. If the downlink measurement reference resource referenced is one downlink measurement reference resource, when the terminal knows the corresponding downlink measurement reference signal resource used when the path loss value is calculated, the terminal may directly read a stored path loss value or RSRP value calculated by using the downlink measurement reference signal resource. If the terminal can read only the RSRP value, the terminal further calculates the path loss value based on PL=Ptx−RSRP. If the downlink measurement reference resource referenced during the path loss calculation is a plurality of downlink measurement reference resources, the terminal takes an average value of the path loss values calculated based on the plurality of downlink measurement reference resources, or takes a minimum value from the path loss values calculated based on the plurality of downlink measurement reference resources, or takes a maximum value from the path loss values calculated based on the plurality of downlink measurement reference resources.

This embodiment of this application is applicable to different SRS resources that use a same analog beam and different digital beams with similar beam shapes. A plurality of SRS processes share the adjustment value to accelerate uplink power control convergence, and share the path loss information to reduce path loss information transmission and signaling overheads.

In another embodiment of this application, for the plurality of uplink measurement reference signal resources, the network device may configure a separate target value and separate path loss information for each uplink measurement reference signal resource, and configure a shared adjustment value, in other words, the network device configures the separate target value and the separate path loss information, and shares adjustment value.

Figure 5:
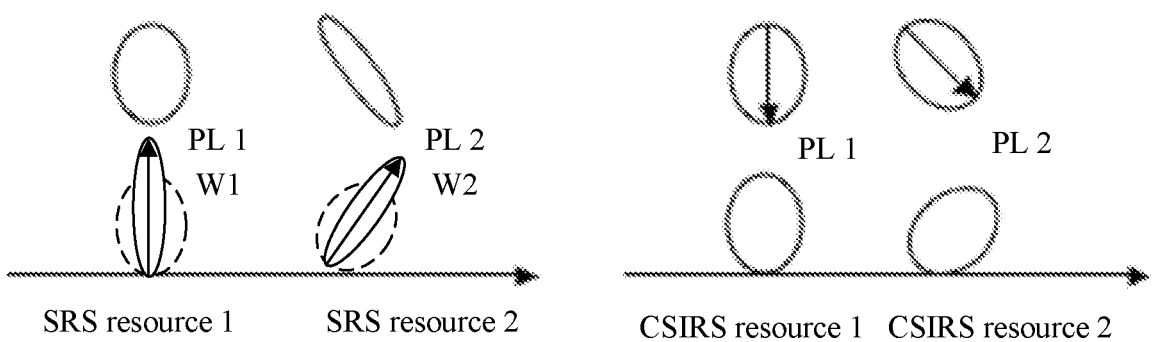
FIG. 5 is another schematic diagram of indicating a power for a plurality of SRS resources according to an example embodiment.

For example, as shown in FIG. 5, the network device determines the power indication information of the uplink measurement reference signal for each SRS resource, and the power indication information of the uplink measurement reference signal includes the target value $P_{O\_SRS_{\varsigma}}$ and the path loss information $PL_c$.

The network device configures the target value $P_{O\_SRS_{\varsigma}}$ and the path loss information $PL_c$ through RRC signaling or MAC CE signaling. The information is usually bound with SRS resource configuration signaling. The path loss information may be used to indicate the path loss value, or a corresponding downlink measurement reference signal resource (for example, an index m of a downlink measurement reference signal resource) used when the path loss value is calculated. The downlink measurement reference resource referenced during the path loss calculation may be one downlink measurement reference resource or a plurality of downlink measurement reference resources. If the downlink measurement reference resource referenced is one downlink measurement reference resource, when the terminal knows the corresponding downlink measurement reference signal resource used when the path loss value is calculated, the terminal may directly read a stored path loss value or RSRP value calculated by using the downlink measurement reference signal resource. If the terminal can read only the RSRP value, the terminal further calculates the path loss value based on PL=Ptx−RSRP. If the downlink measurement reference resource referenced during the path loss calculation is a plurality of downlink measurement reference resources, the terminal takes an average value of the path loss values calculated based on the plurality of downlink measurement reference resources, or takes a minimum value from the path loss values calculated based on the plurality of downlink measurement reference resources, or takes a maximum value from the path loss values calculated based on the plurality of downlink measurement reference resources.

That the network device determines the power indication information of the uplink measurement reference signal for each SRS resource further includes that the network device determines a common adjustment value $f_{SRS,c}(i)$ for all SRS resources.

The network device configures the adjustment value $f_{SRS,c}(i)$ through physical layer signaling. Typically, in an uplink power control area of the physical layer signaling, one field is corresponding to one user. The power adjustment value in the field is applicable to all SRS resources of the user. The power adjustment value may be indicated in a cumulative manner, or may be indicated in a direct manner.

This embodiment of this application is applicable to a scenario in which uplink beam shapes are similar, for example, different SRS resources use different analog beams and digital beams with similar beam shapes. A plurality of SRS processes share the adjustment value to accelerate uplink power control convergence.

In another embodiment of this application, for the plurality of uplink measurement reference signal resources, the network device may configure a shared target value, and configure a separate adjustment value and separate path loss information for each uplink measurement reference signal resource, in other words, the network device shares the target value, and configures the separate adjustment value and the separate path loss information.

Figure 6:
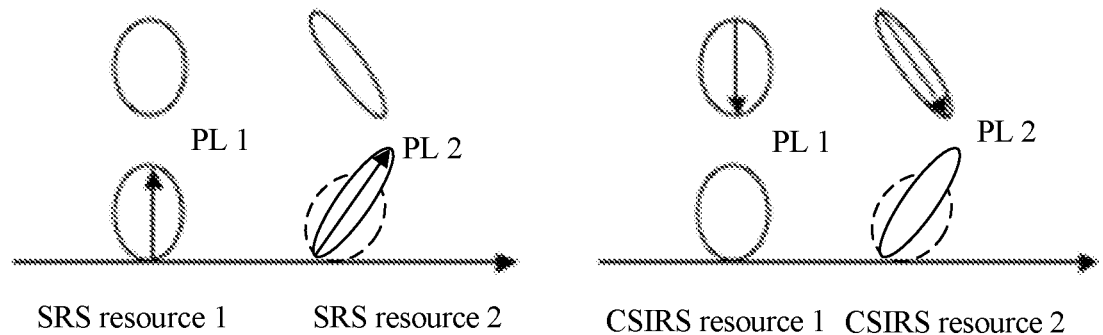
FIG. 6 is another schematic diagram of indicating a power for a plurality of SRS resources according to an example embodiment.

For example, as shown in FIG. 6, that the network device determines the power indication information of the uplink measurement reference signal for each SRS resource further includes that the network device determines a common target value $P_{O\_SRS,c}$ for all the SRS resources.

The network device configures the target value $P_{O\_SRS,c}$ through RRC signaling or MAC CE signaling. The information is usually bound with SRS resource configuration signaling.

The network device determines the power indication information of the uplink measurement reference signal for each SRS resource, and the power indication information of the uplink measurement reference signal includes the adjustment value $f_{SRS,c}(i)$ and the path loss information $PL_c$.

The network device configures the adjustment value $f_{SRS,c}(i)$ through physical layer signaling. Typically, an uplink power control area of the physical layer signaling includes a plurality of SRS resource power control adjustment values, respectively indicating a power control adjustment value for each SRS resource. The power adjustment value may be indicated in a cumulative manner, or may be indicated in a direct manner.

The network device configures the path loss information $PL_c$ through RRC signaling or MAC CE signaling. The information is usually bound with SRS resource configuration signaling.

The path loss information may be used to indicate the path loss value, or a corresponding downlink measurement reference signal resource (for example, an index m of a downlink measurement reference signal resource) used when the path loss value is calculated. The downlink measurement reference resource referenced during the path loss calculation may be one downlink measurement reference resource or a plurality of downlink measurement reference resources. If the downlink measurement reference resource referenced is one downlink measurement reference resource, when the terminal knows the corresponding downlink measurement reference signal resource used when the path loss value is calculated, the terminal may directly read a stored path loss value or RSRP value calculated by using the downlink measurement reference signal resource. If the terminal can read only the RSRP value, the terminal further calculates the path loss value based on PL=Ptx−RSRP. If the downlink measurement reference resource referenced during the path loss calculation is a plurality of downlink measurement reference resources, the terminal takes an average value of the path loss values calculated based on the plurality of downlink measurement reference resources, or takes a minimum value from the path loss values calculated based on the plurality of downlink measurement reference resources, or takes a maximum value from the path loss values calculated based on the plurality of downlink measurement reference resources.

This embodiment of this application is applicable to any SRS resource configuration, for example, different SRS resources use different analog beams and digital beams, so that uplink power of each SRS resource is accurately controlled, and target power is shared to reduce signaling overheads.

In another embodiment of this application, for the plurality of uplink measurement reference signal resources, the network device may configure a shared target value and path loss information, and configure a separate adjustment value for each uplink measurement reference signal resource, in other words, the network device shares the target value and the path loss information, and configures the separate adjustment value.

Figure 7:
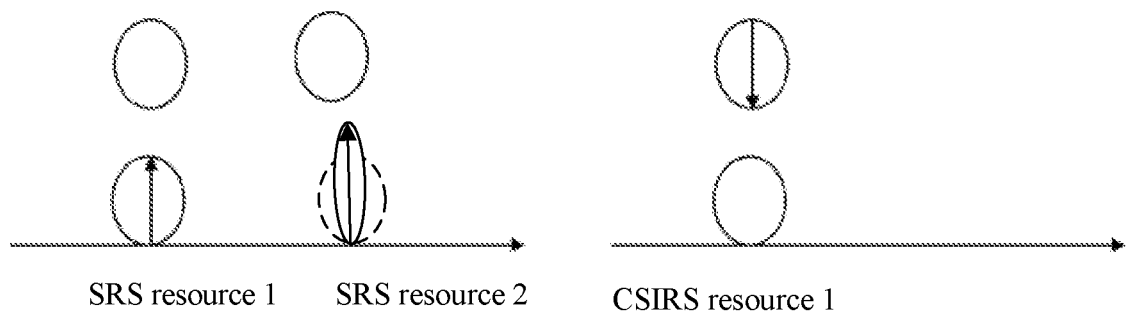
FIG. 7 is another schematic diagram of indicating a power for a plurality of SRS resources according to an example embodiment.

For example, as shown in FIG. 7, that the network device determines the power indication information of the uplink measurement reference signal for each SRS resource further includes that the network device determines a common target value $P_{O\_SRS,c}$ and the path loss information $PL_c$ for all the SRS resources.

The network device configures the target value $P_{O\_SRS,c}$ and the path loss information $PL_c$ through RRC signaling or MAC CE signaling.

The path loss information may be used to indicate the path loss value, or a corresponding downlink measurement reference signal resource (for example, an index m of a downlink measurement reference signal resource) used when the path loss value is calculated. The downlink measurement reference resource referenced during the path loss calculation may be one downlink measurement reference resource or a plurality of downlink measurement reference resources. If the downlink measurement reference resource referenced is one downlink measurement reference resource, when the terminal knows the corresponding downlink measurement reference signal resource used when the path loss value is calculated, the terminal may directly read a stored path loss value or RSRP value calculated by using the downlink measurement reference signal resource. If the terminal can read only the RSRP value, the terminal further calculates the path loss value based on PL=Ptx−RSRP. If the downlink measurement reference resource referenced during the path loss calculation is a plurality of downlink measurement reference resources, the terminal takes an average value of the path loss values calculated based on the plurality of downlink measurement reference resources, or takes a minimum value from the path loss values calculated based on the plurality of downlink measurement reference resources, or takes a maximum value from the path loss values calculated based on the plurality of downlink measurement reference resources.

The network device determines the power indication information of the uplink measurement reference signal for each SRS resource, and the power indication information of the uplink measurement reference signal includes the adjustment value $f_{SRS,c}(i)$.

The network device configures the adjustment value $f_{SRS,c}(i)$ through physical layer signaling. Typically, an uplink power control area of the physical layer signaling includes a plurality of SRS resource power control adjustment values, respectively indicating a power control adjustment value for each SRS resource. The power adjustment value may be indicated in a cumulative manner, or may be indicated in a direct manner. In addition, a separate power control offset set is configured for each SRS process. For a narrow beam, each element in the power control offset set has a relatively large value. For a wide beam, each element in the power control offset set has a relatively small value.

This embodiment of this application is applicable to different SRS resources that use a same analog beam and different digital beams with different beam shapes. The target power and the path loss information are shared to reduce signaling overheads. An independent power adjustment value adapts to any beam shape, so that the power is accurately controlled.

In another embodiment of this application, for the plurality of uplink measurement reference signal resources, the network device may configure a shared target value, a shared adjustment value, and shared path loss information.

In another embodiment of this application, for the plurality of uplink measurement reference signal resources, the network device may configure a shared target value and a shared adjustment value, and configure separate path loss information for each uplink measurement reference signal resource, in other words, the network device shares the target value and the adjustment value, and configures the separate path loss information.

Figure 8:
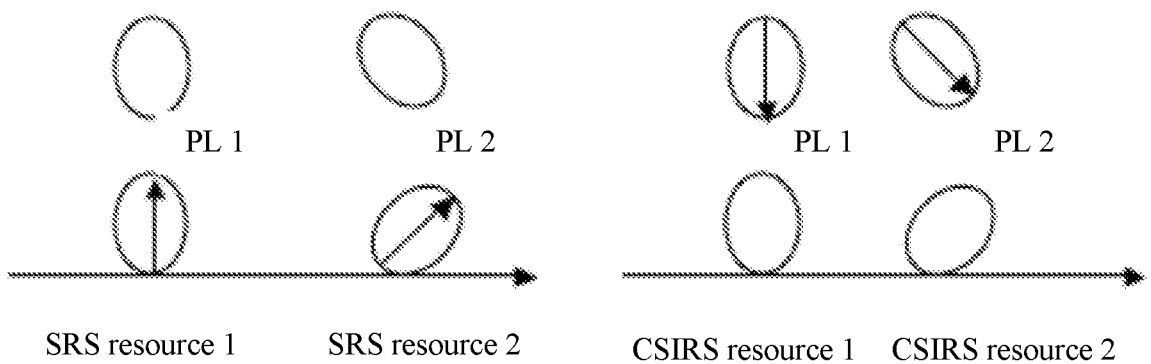
FIG. 8 is another schematic diagram of indicating a power for a plurality of SRS resources according to an example embodiment.

For example, as shown in FIG. 8, the network device determines the power indication information of the uplink measurement reference signal for each SRS resource, and the power indication information of the uplink measurement reference signal includes the path loss information PL. The network device configures the path loss information PL through RRC signaling or MAC CE signaling. The information is usually bound with SRS resource configuration signaling.

The path loss information may be used to indicate the path loss value, or a corresponding downlink measurement reference signal resource (for example, an index m of a downlink measurement reference signal resource) used when the path loss value is calculated. The downlink measurement reference resource referenced during the path loss calculation may be one downlink measurement reference resource or a plurality of downlink measurement reference resources. If the downlink measurement reference resource referenced is one downlink measurement reference resource, when the terminal knows the corresponding downlink measurement reference signal resource used when the path loss value is calculated, the terminal may directly read a stored path loss value or RSRP value calculated by using the downlink measurement reference signal resource. If the terminal can read only the RSRP value, the terminal further calculates the path loss value based on PL=Ptx−RSRP. If the downlink measurement reference resource referenced during the path loss calculation is a plurality of downlink measurement reference resources, the terminal takes an average value of the path loss values calculated based on the plurality of downlink measurement reference resources, or takes a minimum value from the path loss values calculated based on the plurality of downlink measurement reference resources, or takes a maximum value from the path loss values calculated based on the plurality of downlink measurement reference resources.

That the network device determines the power indication information of the uplink measurement reference signal for each SRS resource further includes that the network device determines a common adjustment value $f_{SRS,c}(i)$ and a common target value $P_{O\_SRS,c}$ for all the SRS resources.

The network device configures the target value $P_{O\_SRS,c}$ through RRC signaling or MAC CE signaling.

The network device configures the adjustment value $f_{SRS,c}(i)$ through physical layer signaling. Typically, in an uplink power control area of the physical layer signaling, one field is corresponding to one user. The power adjustment value in the field is applicable to all SRS resources of the user. The power adjustment value may be indicated in a cumulative manner, or may be indicated in a direct manner.

This embodiment of this application is applicable to different SRSs use different analog beams with similar beam shapes. The target power and the adjustment value of the uplink reference signal are shared to reduce signaling overheads.

In this way, the power indication information is independent of data power indication information, and all or some of parameters are separately configured for each set of SRS resources to accurately control uplink power of each set of SRSs, so that the uplink IoT is maintained within a stable range, and channel reception efficiency is increased.

In step S102, the network device sends the power control information to the terminal device.

In step S103, the terminal device receives the power indication information.

The power indication information includes at least one of the transmit power adjustment value, the transmit power adjustment value, and the path loss information.

In actual application, the method further includes the following steps.

The terminal device calculates a path loss value of each of a plurality of downlink measurement reference resources.

The terminal device determines that an average value of the plurality of path loss values, a minimum path loss value of the plurality of path loss values, or a maximum path loss value of the plurality of path loss values is the path loss value.

In step S104, the terminal device sends the uplink measurement reference signal to the network device based on the power control information.

The terminal device sends a sounding reference signal to the network device based on the power control information. Transmit power of the sounding reference signal is set according to the following formula:

$$P_{SRS,c}(i) = \min\{P_{CMAX,c}(i), P_{O\_SRS,c} + 10\log_{10}(M_{SRS,c}) + \alpha_c \cdot PL_c + f_{SRS,c}(i)\}[dBm],$$

where $P_{CMAX,c}(i)$ is maximum transmit power of the terminal; $M_{SRS,c}$ is bandwidth for scheduling the SRS; $\alpha_c$ is a path loss parameter; $P_{CMAX,c}(i)$, $M_{SRS,c}$, and $\alpha_c$ may be obtained in an LTE configuration manner or may be obtained in another manner in actual application; $PL_c$ the path loss value; $f_{SRS,c}(i)$ is the adjustment value; and $P_{O\_SRS,c}$ is the target value.

A plurality of transmit power target values, a plurality of transmit power adjustment values, and a plurality of pieces of path loss information that are obtained by the terminal device based on the power indication information are corresponding to a plurality of uplink measurement reference signal resources; or a plurality of target values and a plurality of adjustment values that are obtained by the terminal device based on the power indication information are corresponding to a plurality of uplink measurement reference signal resources, and one piece of path loss information obtained by the terminal device based on the power indication information is corresponding to the plurality of uplink measurement reference signal resources; or a plurality of target values that are obtained by the terminal device based on the power indication information are corresponding to a plurality of uplink measurement reference signal resources, and one adjustment value and one piece of path loss information that are obtained by the terminal device based on the power indication information are corresponding to the plurality of uplink measurement reference signal resources; or a plurality of target values and a plurality of pieces of path loss information that are obtained by the terminal device based on the power indication information are corresponding to a plurality of uplink measurement reference signal resources, and one adjustment value obtained by the terminal device based on the power indication information is corresponding to the plurality of uplink measurement reference signal resources; or one target value obtained by the terminal device based on the power indication information is corresponding to a plurality of uplink measurement reference signal resources, and a plurality of adjustment values and a plurality of pieces of path loss information that are obtained by the terminal device based on the power indication information are corresponding to the plurality of uplink measurement reference signal resources; or one target value and one piece of path loss information that are obtained by the terminal device based on the power indication information are corresponding to a plurality of uplink measurement reference signal resources, and a plurality of adjustment values obtained by the terminal device based on the power indication information are corresponding to the plurality of uplink measurement reference signal resources; or one target value, one adjustment value, and one piece of path loss information that are obtained by the terminal device based on the power indication information are corresponding to a plurality of uplink measurement reference signal resources; or one target value and one adjustment value that are obtained by the terminal device based on the power indication information are corresponding to a plurality of uplink measurement reference signal resources, and a plurality of pieces of path loss information obtained by the terminal device based on the power indication information are corresponding to the plurality of uplink measurement reference signal resources.

Figure 9:
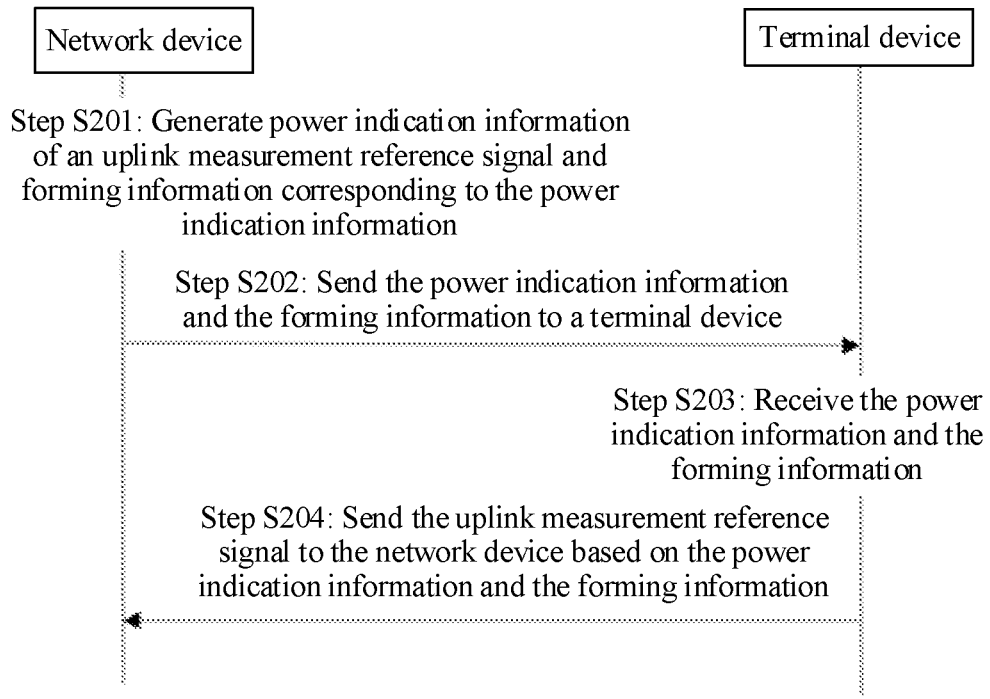
FIG. 9 is a flowchart of another uplink measurement reference signal power control method according to an example embodiment.

Optionally, different from the foregoing embodiment, as shown in FIG. 9, in another embodiment of this application, the method includes the following steps.

In step S201, a network device generates power indication information of an uplink measurement reference signal, and the network device generates forming information corresponding to the power indication information; where the forming information includes at least one of the following: an index of a downlink measurement reference resource, a codebook index value, and quantized channel information.

In step S202, the network device sends the power control information and the forming information to a terminal device.

In step S203, the terminal device receives the power control information and the forming information, where the forming information is corresponding to the power indication information, and the forming information includes the index of the downlink measurement reference resource, the codebook index value, or the quantized channel information.

In step S204, the terminal device sends the uplink measurement reference signal to the network device based on the power control information and the forming information.

According to the method provided in the embodiments of this application, the network device generates the power indication information, and the power indication information includes at least one of the foregoing three types of information and is indicated to the terminal device, so that the terminal device sends a sounding reference signal to the network device based on the power indication information, and the network device accurately controls transmit power used when the terminal device sends the sounding reference signal.

Figure 10:
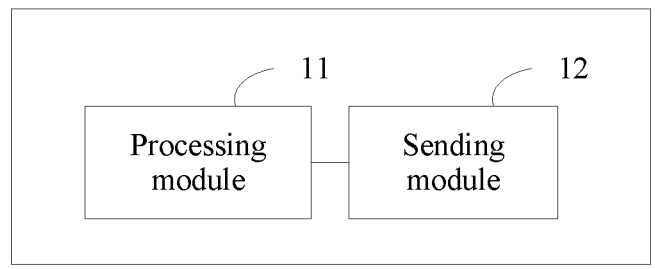
FIG. 10 is a schematic structural diagram of a network device according to an example embodiment.

As shown in FIG. 10, in another embodiment of this application, a network device is provided, including:

a processing module 11, configured to generate power indication information of an uplink measurement reference signal, where the power indication information includes at least one of a transmit power target value, a transmit power adjustment value, and path loss information; and a sending module 12, configured to send the power control information to a terminal device.

In another embodiment of this application, the path loss information includes at least one of the following: a path loss value, a reference signal received power RSRP value, and at least one downlink measurement reference resource that is referenced during path loss calculation.

In another embodiment of this application, for a plurality of uplink measurement reference signal resources, the processing module is further configured to perform any of the following processing:

configuring a separate transmit power adjustment value, a separate transmit power adjustment value, and separate path loss information for each uplink measurement reference signal resource;

configuring a separate target value and a separate adjustment value for each uplink measurement reference signal resource, and configuring shared path loss information;

configuring a separate target value for each uplink measurement reference signal resource, and configuring a shared adjustment value and shared path loss information;

configuring a separate target value and separate path loss information for each uplink measurement reference signal resource, and configuring a shared adjustment value;

configuring a shared target value, and configuring a separate adjustment value and separate path loss information for each uplink measurement reference signal resource;

configuring a shared target value and shared path loss information, and configuring a separate adjustment value for each uplink measurement reference signal resource;

configuring a shared target value, a shared adjustment value, and shared path loss information; or configuring a shared target value and a shared adjustment value, and configuring separate path loss information for each uplink measurement reference signal resource.

In another embodiment of this application, in the network device, the processing module is further configured to generate forming information corresponding to the power indication information; where the forming information includes at least one of the following: an index of the downlink measurement reference resource, a codebook index value, and quantized channel information; and the sending module is further configured to send the forming information to the terminal device.

Figure 11:
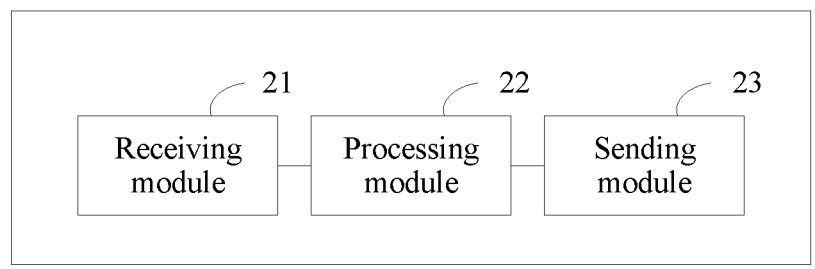
FIG. 11 is a schematic structural diagram of a terminal device according to an example embodiment.

As shown in FIG. 11, in another embodiment of this application, a terminal device is provided, including:

a receiving module, configured to receive power indication information, where the power indication information includes at least one of a transmit power target value of an uplink measurement reference signal, a transmit power adjustment value, and path loss information;

a processing module, configured to generate the uplink measurement reference signal based on the power control information; and a sending module, configured to send the uplink measurement reference signal to the network device.

In another embodiment of this application, the path loss information includes at least one of the following: a path loss value, a reference signal received power RSRP value, and at least one downlink measurement reference resource that is referenced during path loss calculation.

In another embodiment of this application, in the terminal device, the processing module is further configured to calculate a path loss value of each of a plurality of downlink measurement reference resources; and the processing module is further configured to determine that an average value of the plurality of path loss values, a minimum path loss value of the plurality of path loss values, or a maximum path loss value of the plurality of path loss values is the path loss value.

In another embodiment of this application, a plurality of transmit power target values, a plurality of transmit power adjustment values, and a plurality of pieces of path loss information that are obtained by the processing module based on the power indication information are corresponding to a plurality of uplink measurement reference signal resources; or a plurality of target values and a plurality of adjustment values that are obtained by the processing module based on the power indication information are corresponding to a plurality of uplink measurement reference signal resources, and one piece of path loss information obtained by the processing module based on the power indication information is corresponding to the plurality of uplink measurement reference signal resources; or a plurality of target values that are obtained by the processing module based on the power indication information are corresponding to a plurality of uplink measurement reference signal resources, and one adjustment value and one piece of path loss information that are obtained by the processing module based on the power indication information are corresponding to the plurality of uplink measurement reference signal resources; or a plurality of target values and a plurality of pieces of path loss information that are obtained by the processing module based on the power indication information are corresponding to a plurality of uplink measurement reference signal resources, and one adjustment value that is obtained by the processing module based on the power indication information is corresponding to the plurality of uplink measurement reference signal resources; or one target value that is obtained by the processing module based on the power indication information is corresponding to a plurality of uplink measurement reference signal resources, and a plurality of adjustment values and a plurality of pieces of path loss information that are obtained by the processing module based on the power indication information are corresponding to the plurality of uplink measurement reference signal resources; or one target value and one piece of path loss information that are obtained by the processing module based on the power indication information are corresponding to a plurality of uplink measurement reference signal resources, and a plurality of adjustment values that are obtained by the processing module based on the power indication information are corresponding to the plurality of uplink measurement reference signal resources; or one target value, one adjustment value, and one piece of path loss information that are obtained by the processing module based on the power indication information are corresponding to a plurality of uplink measurement reference signal resources; or one target value and one adjustment value that are obtained by the processing module based on the power indication information are corresponding to a plurality of uplink measurement reference signal resources, and a plurality of pieces of path loss information obtained by the processing module based on the power indication information are corresponding to the plurality of uplink measurement reference signal resources.

In another embodiment of this application, in the terminal device, the receiving module is further configured to receive forming information from the network device, where the forming information is corresponding to the power indication information, and the forming information includes an index of the downlink measurement reference resource, a codebook index value, or quantized channel information;

the processing module is further configured to generate the uplink measurement reference signal based on the power control information and the forming information; and the sending module is further configured to send the uplink measurement reference signal to the network device.

Figure 12:
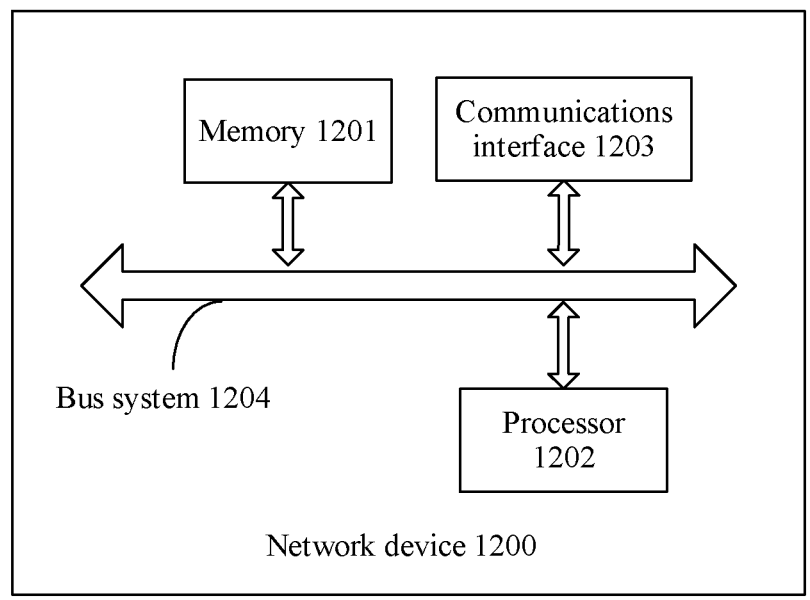
FIG. 12 is a schematic structural diagram of another network device according to an embodiment of this application.

An embodiment of this application further provides a network device 1200. As shown in FIG. 12, the network device 1200 includes a memory 1201, a processor 1202, and a communications interface 1203. The memory 1201 is configured to store code or a program. The processor 1202 is configured to invoke the code or the program to perform any one of the methods performed by the network device that are shown in FIG. 1 and FIG. 9. The communications interface 1203 is configured to communicate with another device.

The memory 1201, the processor 1202, and the communications interface 1203 are coupled together by using a bus system 1204, or may be connected in another manner. The memory 1201 may include a random access memory, or may include a non-volatile memory, such as at least one magnetic disk storage. The bus system 1204 may be an industry standard architecture (ISA) bus, a peripheral component interconnect (PCI) bus, an extended industry standard architecture (EISA) bus, or the like. The bus system 1204 may be classified into an address bus, a data bus, a control bus, and the like. For ease of representation, only one thick line is used to represent the bus in FIG. 12, but this does not mean that there is only one bus or only one type of bus.

In an implementation, the receiving module and the sending module in FIG. 10 may be integrated into the communications interface 1203, and the remaining modules may be integrated into the processor 1202. The remaining modules may be embedded in or independent of the processor of the network device in a hardware form, or may be stored in the memory of the network device in a software form, so that the processor invokes the code or the program to perform operations corresponding to the foregoing modules. The processor may be a central processing unit (CPU), an application-specific integrated circuit (ASIC), or is configured into one or more integrated circuits for implementing the embodiments of this application.

Each component in the network device 1200 provided in this embodiment of this application is configured to perform the foregoing methods. Therefore, for beneficial effects of the network device 1200, refer to the beneficial effects of the foregoing methods. Details are not described herein again.

Figure 13:
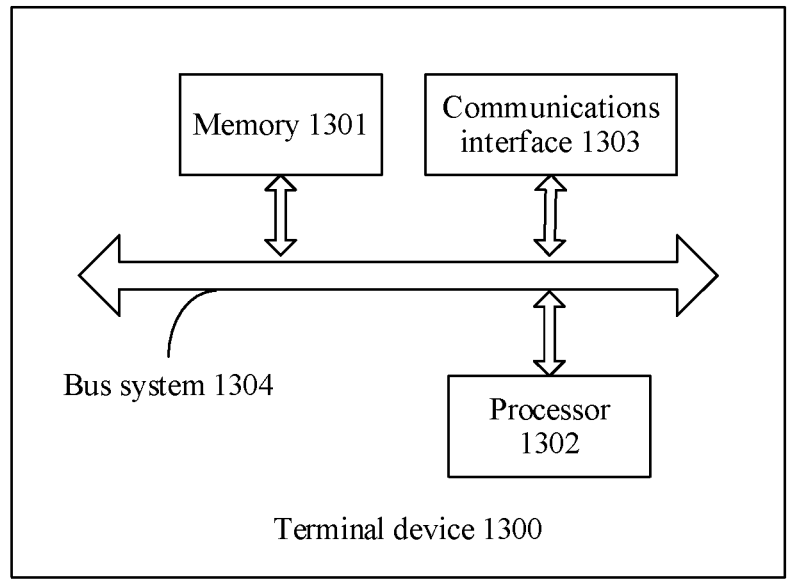
FIG. 13 is a schematic structural diagram of another terminal device according to an embodiment of this application.

An embodiment of this application further provides a terminal device 1300. As shown in FIG. 13, the terminal device 1300 includes a memory 1301, a processor 1302, and a communications interface 1303. The memory 1301 is configured to store code or a program. The processor 1302 is configured to invoke the code or the program to perform any one of the methods performed by the terminal device that are shown in FIG. 1 and FIG. 9. The communications interface 1303 is configured to communicate with another device.

The memory 1301, the processor 1302, and the communications interface 1303 are coupled together by using a bus system 1304, or may be connected in another manner. The memory 1301 may include a random access memory, or may include a non-volatile memory, such as at least one magnetic disk storage. The bus system 1304 may be an industry standard architecture (ISA) bus, a peripheral component interconnect (, PCI) bus, an extended industry standard architecture (EISA) bus, or the like. The bus system 1304 may be classified into an address bus, a data bus, a control bus, and the like. For ease of representation, only one thick line is used to represent the bus in FIG. 13, but this does not mean that there is only one bus or only one type of bus.

In an implementation, the receiving module and the sending module in FIG. 11 may be integrated into the communications interface 1303, and the remaining modules may be integrated into the processor 1302. The remaining modules may be embedded in or independent of the processor of the network device in a hardware form, or may be stored in the memory of the network device in a software form, so that the processor invokes the code or the program to perform operations corresponding to the foregoing modules. The processor may be a central processing unit (CPU), an application-specific integrated circuit (ASIC), or is configured into one or more integrated circuits for implementing the embodiments of this application.

Each component in the terminal device 1300 provided in this embodiment of this application is configured to perform the foregoing methods. Therefore, for beneficial effects of the terminal device 1300, refer to the beneficial effects of the foregoing methods. Details are not described herein again.

During specific implementation, this application further provides a computer storage medium. The computer storage medium may store a program, and when the program is executed, some or all of the steps of the embodiments of the sounding reference signal power control method provided in this application may be performed. The storage medium may be a magnetic disk, an optical disc, a read-only memory (ROM), a random access memory (RAM), or the like.

For same or similar parts in the embodiments in this specification, refer to these embodiments. Especially, wireless communications device embodiments are basically similar to a method embodiment, and therefore are described briefly. For related parts, refer to descriptions in the method embodiment.

The foregoing descriptions are implementations of this application, but are not intended to limit the protection scope of this application.

What is claimed is:

1. A method for controlling power of a sounding reference signal (SRS), applied to a network device, the method comprising:
    generating, by the network device, power control information and forming information, which is associated with the power control information, for each set of SRSs sharing one or more attributes,
        wherein the power control information comprises path loss information comprising an index of a first downlink measurement reference resource that is referenced for determining a path loss, and
        wherein the forming information comprises an index of a second downlink measurement reference resource; and
    sending, by the network device, the power control and forming information to a terminal device for use by the terminal device to send the SRS.

2. The method according to claim 1, wherein the path loss information further comprises at least one of the following: a path loss value, a reference signal received power (RSRP) value.

3. The method according to claim 1, further comprising configuring separate power control information and forming information for each of a plurality of uplink measurement reference signal resources.

4. The method according to claim 1, wherein the forming information further comprises at least one of the following: a codebook index value, or quantized channel information.

5. A method for controlling power of a sounding reference signal (SRS), applied to a terminal device, the method comprising:
    receiving, by the terminal device, power control and forming information for the SRS,
        wherein the power control information comprises path loss information comprising an index of a first downlink measurement reference resource that is referenced for determining a path loss, and wherein the forming information comprises an index of a second downlink measurement reference resource; and sending, by the terminal device, the SRS to a network device based on the power control and forming information.

6. The method according to claim 5, wherein the path loss information further comprises at least one of the following: a path loss value, a reference signal received power (RSRP) value.

7. The method according to claim 5, further comprising obtaining separate power control information and forming information for each of a plurality of SRSs.

8. The method according to claim 5, wherein the forming information further comprises a codebook index value, or quantized channel information.

9. An apparatus controlling power of a sounding reference signal (SRS), the apparatus comprising:

at least one processor configured to generate power control information and forming information, which is associated with the power control information, for each set of SRSs sharing one or more attributes, wherein the power control information comprises path loss information comprising an index of a first downlink measurement reference resource that is referenced for determining a path loss, and wherein the forming information comprises an index of a second downlink measurement reference resource; and a transmitter configured to cooperate with the at least one processor to send the power control and forming information to a terminal device for use by the terminal device to send the SRS.

10. The apparatus according to claim 9, wherein the path loss information further comprises at least one of the following: a path loss value, a reference signal received power (RSRP) value.

11. The apparatus according to claim 9, wherein the at least one processor is further configured to configure separate power control information and forming information for each of a plurality of uplink measurement reference signal resources.

12. The apparatus according to claim 9, wherein the forming information further comprises at least one of the following: a codebook index value, and quantized channel information; and the transmitter is further configured to cooperate with the at least one processor to send the forming information to the terminal device.

13. An apparatus for controlling power of a sounding reference signal (SRS), the apparatus comprising:

a receiver configured to cooperate with at least one processor to receive power control and forming information for the SRS, wherein the power control information comprises path loss information comprising an index of a first downlink measurement reference resource that is referenced for determining a path loss, and wherein the forming information comprises an index of a second downlink measurement reference resource;

the at least one processor configured to generate the SRS based on the power control and forming information; and a transmitter configured to cooperate with the at least one processor to send the SRS to the network device.

14. The apparatus according to claim 13, wherein the path loss information further comprises at least one of the following: a path loss value, a reference signal received power (RSRP) value.

15. The apparatus according to claim 13, wherein the at least one processor is configured to obtain separate power control and forming information for each of a plurality of SRSs.

16. The apparatus according to claim 13, wherein the forming information further comprises a codebook index value, or quantized channel information.

* * * * *